(12) United States Patent
Kitora

(10) Patent No.: US 8,199,967 B2
(45) Date of Patent: Jun. 12, 2012

(54) IMAGE PROCESSING APPARATUS, IMAGE PROCESSING METHOD, AND STORAGE MEDIUM

(75) Inventor: Masakazu Kitora, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1003 days.

(21) Appl. No.: 12/139,071

(22) Filed: Jun. 13, 2008

(65) Prior Publication Data

US 2008/0310719 A1 Dec. 18, 2008

(30) Foreign Application Priority Data

Jun. 14, 2007 (JP) ................................. 2007-157608

(51) Int. Cl.
*G06K 9/00* (2006.01)
(52) U.S. Cl. .......................................... 382/100; 714/48
(58) Field of Classification Search .................. 382/100; 714/48
See application file for complete search history.

(56) References Cited

U.S. PATENT DOCUMENTS 7,624,071 B2 * 11/2009 Buchanan et al. .............. 705/45
2004/0075751 A1 * 4/2004 Takahashi .................. 348/231.2

FOREIGN PATENT DOCUMENTS

| JP | 5-342408 A | 12/1993 |
| JP | 11-088659 A | 3/1999 |
| JP | 2006-25129 A | 1/2006 |

* cited by examiner

*Primary Examiner* — John Strege
(74) *Attorney, Agent, or Firm* — Canon U.S.A., Inc. IP Division

(57) ABSTRACT

An image processing apparatus includes an analyzing unit configured to analyze an incomplete portion of input image data; and an obtaining unit configured to identify a storage location of original data corresponding to the input image data from the input image data, and to obtain the original data from the storage location. The original data obtained by the obtaining unit is corrected on the basis of a result of analysis by the analyzing unit to generate a complete image, and the complete image is output.

19 Claims, 12 Drawing Sheets

```
1 2 3 4 5 6 7 8 9 10                          600
ABCDEFGHIJKLMN
OPQRSTUV
WXYZ//////@@@@@
abcdefghijklmn
opqrstuv
wxyz::::::::::

ABCDEFGHIJKLMN
OPQRSTUV
WXYZ//////@@@@@
abcdefghijklmn
opqrstuv
wxyz::::::::::
```

FIG. 6B

```
1 2 3 4 5 6 7 8 9 10                          601
ABCDEFGHIJKLMN
OPQRSTUV
WXYZ//////@@@@@
abcdefghijklmn
opqrstuv
wxyz::::::::::
ABCDEFGHIJKLMN
OPQRSTUV
WXYZ//////@@@@@
abcdefghijklmn
opqrstuv
wxyz::::::::::
```

INCOMPLETE CHARACTERS

FIG. 10
FIG. 10A
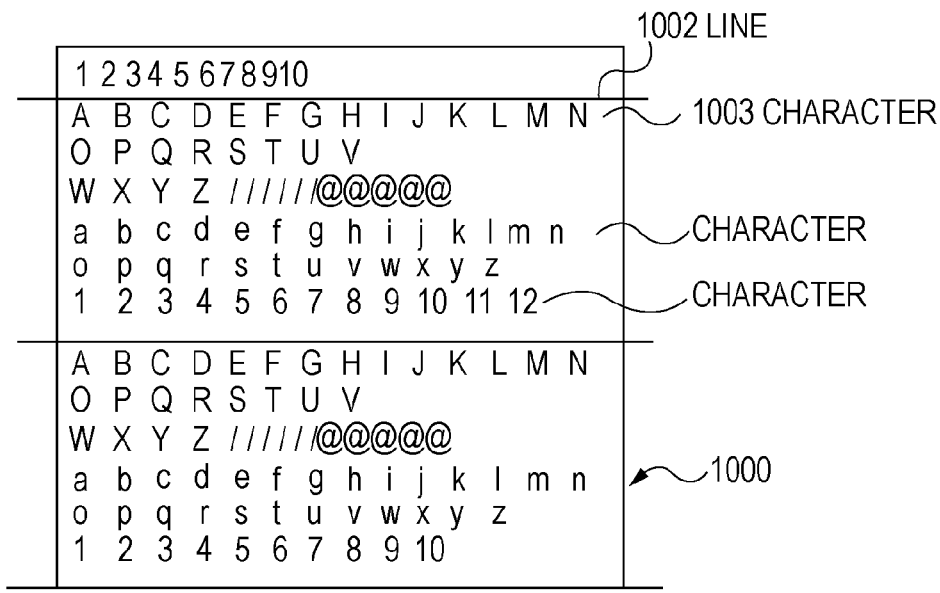
FIG. 10B
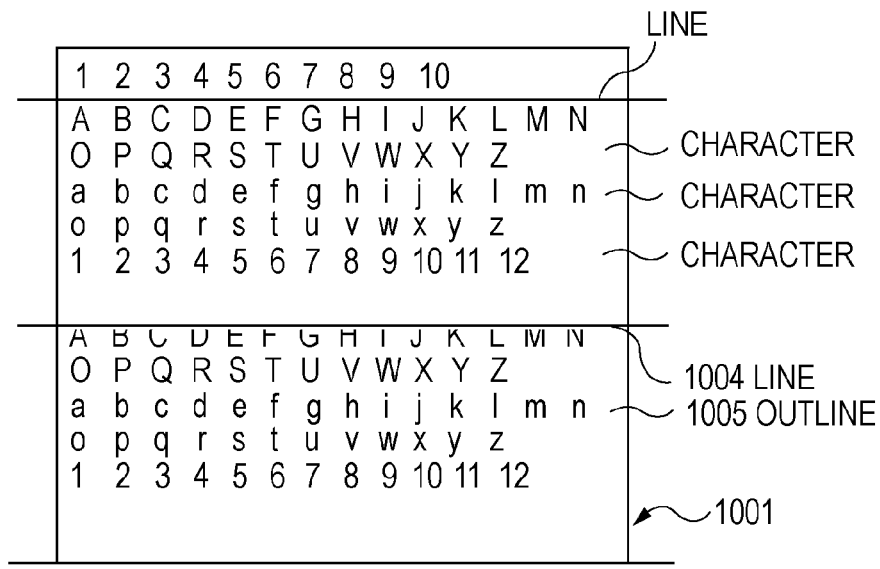

IMAGE PROCESSING APPARATUS, IMAGE PROCESSING METHOD, AND STORAGE MEDIUM

BACKGROUND OF THE INVENTION

1. Field of the Invention

The present invention relates to image processing apparatuses and image processing methods and storage media with which it is possible to deal with metadata.

2. Description of the Related Art

In recent image processing systems, image processing apparatuses having functions for scanning rasterized images and then reusing them as objects, i.e., multi-function peripherals (MFPs), have been proposed (e.g., Japanese Patent Laid-Open No. 5-342408).

Furthermore, in order to execute processing in such a manner than characteristics of data are properly taken into consideration, techniques for attaching metadata (attached information regarding data) so that desired data can be processed optimally have been proposed (e.g., Japanese Patent Laid-Open No. 2006-0025129).

Furthermore, techniques have also been proposed for attaching, on an original paper document, access information for original data stored in an external apparatus, image processing apparatus, or the like on a network and copying the original data (e.g., Japanese Patent Laid-Open No. 11-088659).

However, in the case of an original document that is printed with some problem, according to the existing techniques for original copying, the original data is simply printed with the problem as it is, i.e., the problem is not solved.

SUMMARY OF THE INVENTION

The present invention makes it possible to obtain a correct image when a problem exists in a result of outputting original data, such as an incomplete image.

According to an aspect of the present invention, there is provided an image processing apparatus including an analyzing unit configured to analyze an incomplete portion of input image data; and an obtaining unit configured to identify a storage location of original data corresponding to the input image data from the input image data, and to obtain the original data from the storage location, wherein the original data obtained by the obtaining unit is corrected on the basis of a result of analysis by the analyzing unit to generate a complete image, and the complete image is output.

According to another aspect of the present invention, there is provided an image processing method including analyzing an incomplete portion of input image data; and identifying a storage location of original data corresponding to the input image data from the input image data, and obtaining the original data from the storage location, wherein the original data obtained in the obtaining is corrected on the basis of a result of analysis in the analyzing to generate a complete image, and the complete image is output.

According to the present invention, it is possible to correct an input image read by an image processing apparatus into an appropriate state before it is output.

The appropriate state refers to a state where text in original data is represented by a complete image so that it is recognizable by a user.

Accordingly, it is possible to output original data stored in an external apparatus, image processing apparatus, or the like on a network as user-recognizable data in an appropriate state.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification illustrate embodiments of the invention and, together with the description, serve to explain the principles of the invention.

FIGS. 6A and 6B are diagrams for explaining an example of objects according to the first embodiment of the present invention.

FIGS. 10A and 10B are diagrams for explaining an example of objects in a second embodiment of the present invention.

DESCRIPTION OF THE EMBODIMENTS

Now, image processing systems according to embodiments of the present invention will be described with reference to the drawings.

Overview of the System

Figure 1:
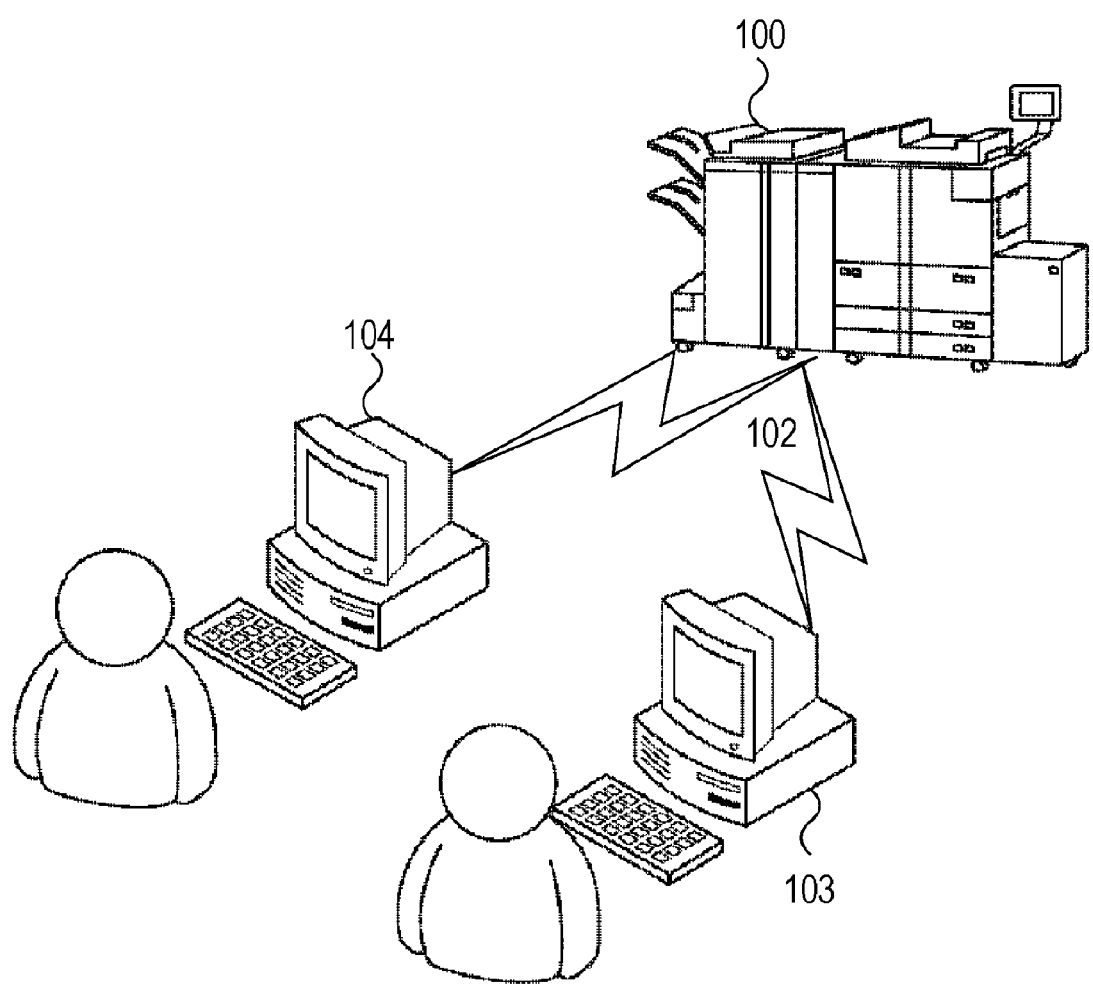
FIG. 1 is an illustration of an image processing system according to the present invention.

FIG. 1 is a diagram showing an image processing system according to the present invention. An image processing apparatus 100 is a multifunctional peripheral (MFP) that processes image data, and is connected to external apparatuses 103 and 104 via a network 102. The number of external apparatuses connected is not limited to two, and the external apparatuses may be an indefinite number of external apparatuses connected on a network.

Overview of the MFP

Figure 2:
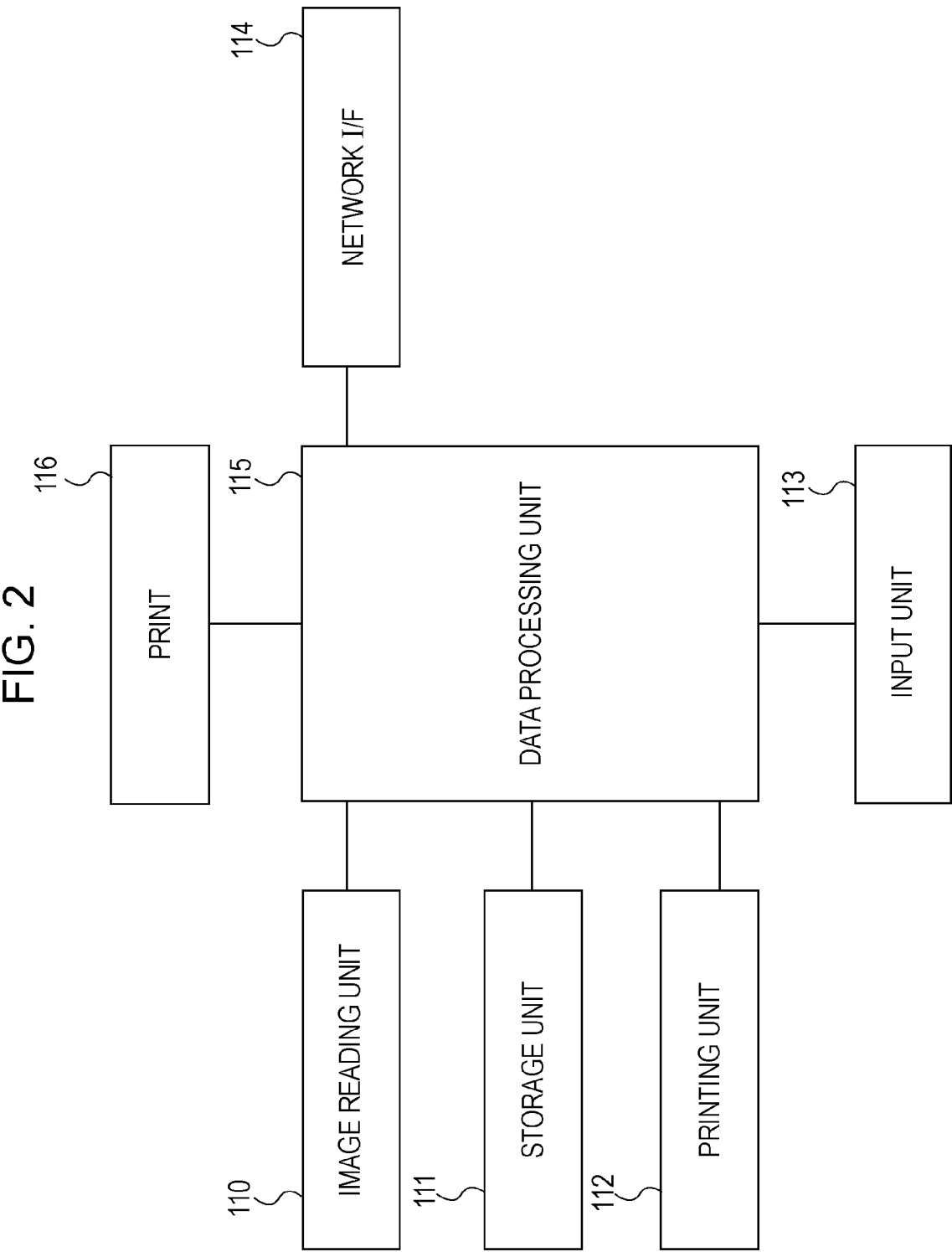
FIG. 2 is a diagram showing an image processing apparatus (MFP) according to the present invention.

FIG. 2 is an internal block diagram of the MFP 100.

FIG. 2 is a diagram showing the detailed configuration of the MFP 100 in embodiments of the present invention.

Referring to FIG. 2, an image reading unit 110 including an auto document feeder (ADF) irradiates a bundle of sheets or a sheet of an original document image with light from a light source (not shown). Then, the image reading unit 110 forms a reflected image of the original document on a solid-state imaging device through a lens so that raster image reading signals are obtained from the solid-state imaging device as image information (raster image) having a predetermined density (e.g., 600 dpi).

Furthermore, the MFP 100 has a copying function of printing an image corresponding to the image reading signals on a recording medium using a printing unit 112. In the case where only one copy of the original document image is to be printed, the image reading signals are processed in a data processing unit 115 to generate recording signals, and an image corresponding to the recording signals is printed on a recording medium using the printing unit 112. On the other hand, in the case where multiple copies of the original document image are to be printed, recording signals for one page are temporarily stored in a storage unit 111, and the recording signals are output to the printing unit 112 so that a corresponding image is printed sequentially on recording media.

Furthermore, instead of storing the recording signals in the storage unit 111, the recording signals can be output from a network interface (I/F) 114 and stored in the external apparatus 103 or 104 via the network 102.

The data processing unit 115 performs feature analysis on the image signals obtained from the image reading unit 110 to generate metadata described later. Furthermore, the data processing unit 115 converts the image signals into an image file in a compressed image file format, such as TIFF or JPEG, or in a vector data file format, such as PDF, and generates meta image data in which the result of the feature analysis is attached to the image file. When the file is sent, the meta image data is output from the network I/F 114. The meta image data output from the network I/F 114 is sent to the external apparatus 103 or 104 via the network 102.

In the printing unit 112, using its printing function, the data processing unit 115 receives print data output from, for example, the external apparatus 103 or 104, via the network I/F 114. The data processing unit 115 converts the print data into raster data that can be printed by the printing unit 112, and then the printing unit 112 forms an image on a printing medium.

An operator can issue instructions to the MFP 100 via an input unit 113 and a display 116, formed of a key operation unit or a touch panel, provided on the MFP 100. Operations according to the instructions are controlled in a controller (not shown) of the data processing unit 115. Furthermore, the status of input of operation instructions and an image of data being processed are displayed on the display 116.

The storage unit 111 is implemented, for example, by a hard disk having a large storage capacity. The storage unit 111 serves as a database storing input image data read by the image reading unit 110, meta image data generated by the data processing unit 115, and image data or original data sent from the external apparatus 103 or 104.

First Embodiment

Figure 3:
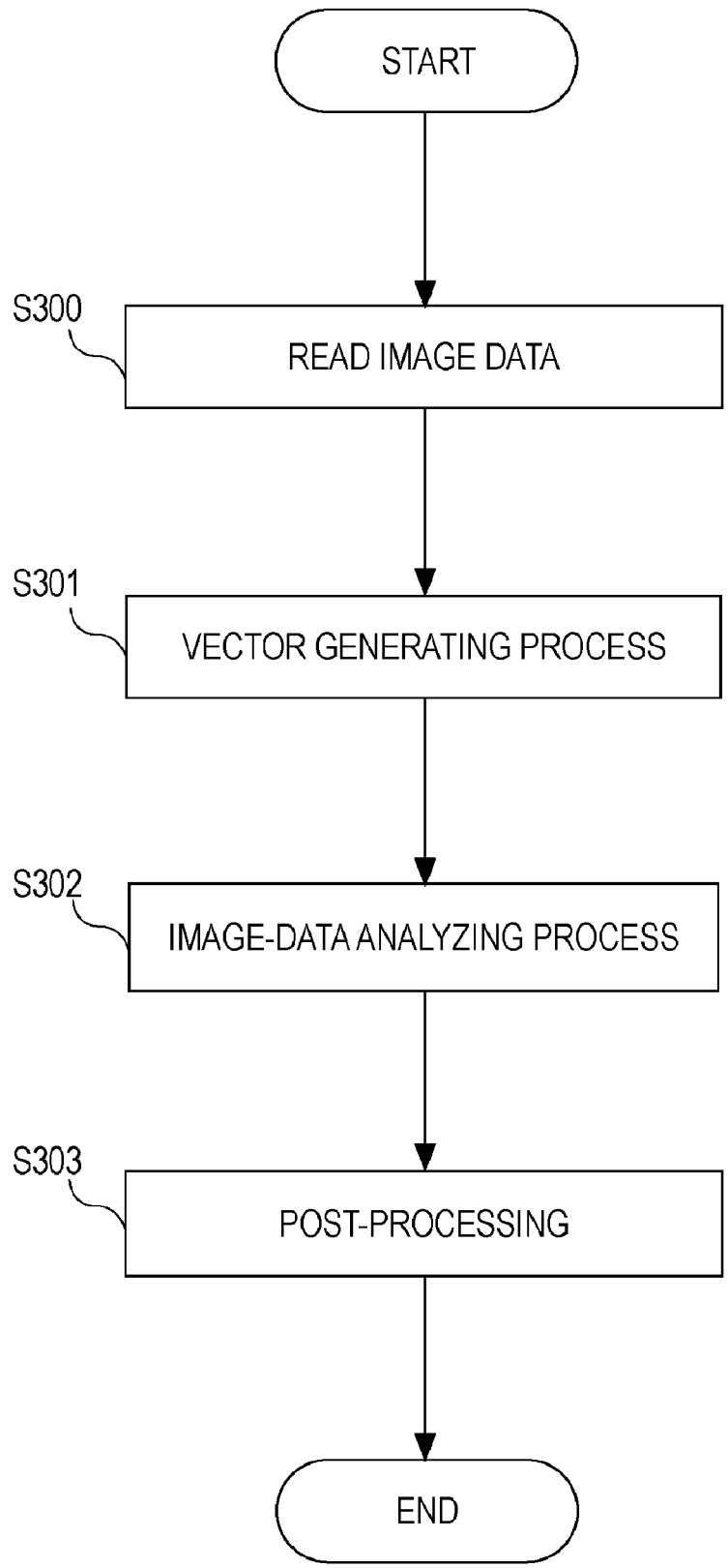
FIG. 3 is a flowchart showing image processing according to the present invention.

An overview of an input-image-data reading process according to a first embodiment, executed in the image processing system, will be described with reference to FIGS. 3 and 4.

Overview of the Process

A series of processing procedures from an image reading procedure of reading an original document image from the image reading unit 110 to a procedure of generating meta image data through a vector generating process will be described with reference to a flowchart shown in FIG. 3.

First, in step S300, according to an instruction input by an operator from the input unit 113, the image reading unit 110 reads an original document image. More specifically, the image reading unit 110 raster-scans and reads a sheet of original document to obtain, for example, 600-dpi 8-bit image signals.

Then, the data processing unit 115 performs preprocessing on the image signals, and the preprocessed image signals are saved as image data of one page in the storage unit 111 or the external apparatus 103 or 104.

A CPU of the data processing unit 115 separates the input image data into objects, and performs a vector generating process in step S301. The procedure of object generation and the procedure of vector generation will be described with reference to a flowchart shown in FIG. 4.

Vector Generating Process

Figure 4:
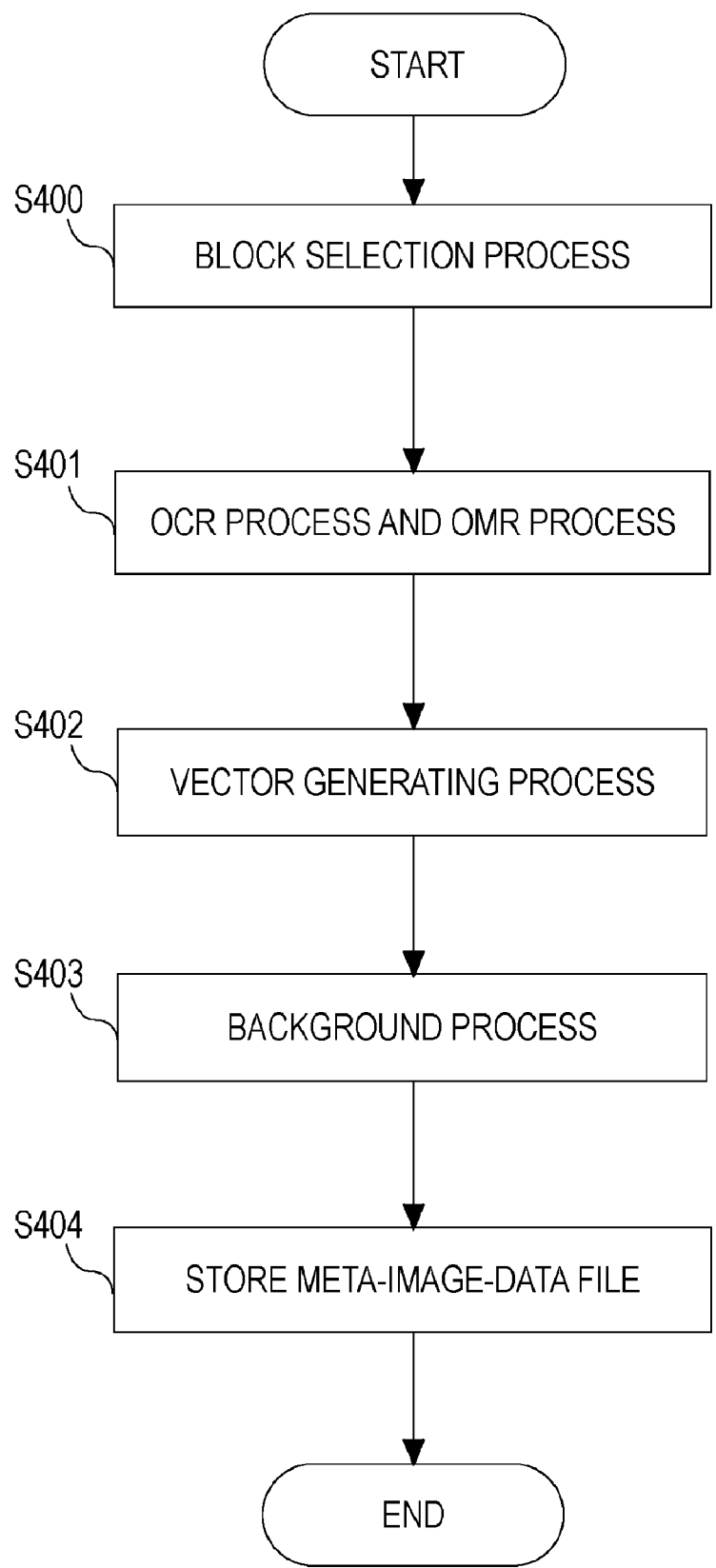
FIG. 4 is a flowchart showing a vector generating process according to the present invention.

As shown in FIG. 4, first, in step S400, the data processing unit 115 executes a block selection (BS) process.

The CPU of the data processing unit 115 divides image signals under processing, stored in the storage unit 111 or sent from the external apparatus 103 or 104, into a region of text/line image and a region of halftone image. Furthermore, the region of text/line image is classified and divided into blocks corresponding to paragraphs or into blocks corresponding to tables or graphic patterns formed of lines.

On the other hand, the region of halftone image is classified and divided into independent objects (blocks) individually corresponding to blocks such as image regions, background regions, or the like of blocks separated into rectangles.

In this embodiment, examples of attributes corresponding to objects formed by division include the following: TEXT object representing a text, GRAPHIC object representing a line or graphic pattern, TABLE object representing a table, IMAGE object representing a natural image, and BACKGROUND object representing a background. However, the types of attributes are not limited to the above, and other types of attributes may be used depending on application or purpose, and it is not necessary to use all of the above attributes.

Then, in step S401, the CPU of the data processing unit 115 performs an OCR process on a text block obtained by the block selection process in step S400.

Furthermore, regarding a GRAPHIC area obtained through the block selection process in step S400, the CPU of the data processing unit 115 performs an optical mark recognition (OMR) process. Through the OMR process, the CPU of the data processing unit 115 checks whether pointer information representing a storage location of the original data file is embedded in the GRAPHIC area.

More specifically, the CPU of the data processing unit 115 detects an object corresponding to a two-dimensional barcode from the GRAPHIC object and decodes the two-dimensional barcode. Then, the CPU detects pointer information indicating the storage location of the original data file of the input image in an external apparatus or the storage unit 111. The pointer information is, for example, information formed of an IP address of the external apparatus, a path name, and a file name, or a URL itself.

The pointer information may be provided for each original document or for each attribute.

In next step S402, a vector data generating process is executed for each object. For example, a TEXT object is converted into font data. A GRAPHIC (line or graphic pattern) object is converted into a vector as an outlined or approximated function.

Furthermore, in a TABLE object, cell information in the frame of the table is converted into at least one of font data and an outlined or approximated function.

The frame of the table is converted into a vector as an outlined or approximated function, and each item of cell information in the frame of the table is encoded as a table object in association with the table.

Furthermore, an IMAGE object is compressed at a low compression rate (e.g., JPEG compression at a low compression rate) while maintaining the reading resolution of 600 dpi by the image reading unit 110.

Then, in step S403, a background process is executed on a BACKGROUND object.

In the background process, for example, histograms of RGB components are generated regarding an image corresponding to the BACKGROUND object. On the basis of the histograms, if it is determined that the distributions of the colors are uniform in the BACKGROUND object, the BACKGROUND object is converted into vector data representing a rectangle and the vector data is saved. On the other hand, if it is determined that the distributions of colors are not uniform, the BACKGROUND object undergoes resolution conversion from the reading resolution of 600 dpi to a lower resolution (e.g., a resolution of 300 dpi), the resulting data is compressed at a high compression rate (e.g., JPEG compression at a high compression rate), and the compressed data is saved.

The low compression rate and the high compression rate are defined herein as, for example, a compression rate higher than or equal to a predetermined compression rate (e.g., 50%) and a compression rate lower than the predetermined compression rate.

After the background process in step S403, in step S404, layout information and attribute information of each object (block) and pointer information of the original data are saved as a metadata file in the storage unit 111 or the external apparatus 103 or 104. The pointer information may be a single item of information or a plurality of items of information depending on the original document being processed, so that the pointer information may be stored for each object or for each original document.

The meta image data file obtained through the processes described above includes all the vector information, in an editable form, that is visually very approximate to the original document image that has been read, and it is possible to directly process, reuse, store, transmit, or reprint the vector information.

Then, the vector data obtained through the vector generating process in step S301 undergoes an image data analyzing process in step S302. The procedure of the image data analyzing process will be described in detail with reference to FIG. 5.

Image Analyzing Process

In the image analyzing process, it is checked whether any problem exists in the generated vector data. An example of the problem is a phenomena in which a text string in the TABLE data is not accommodated within a cell frame so that the text string is not complete in a printout.

Figure 5:
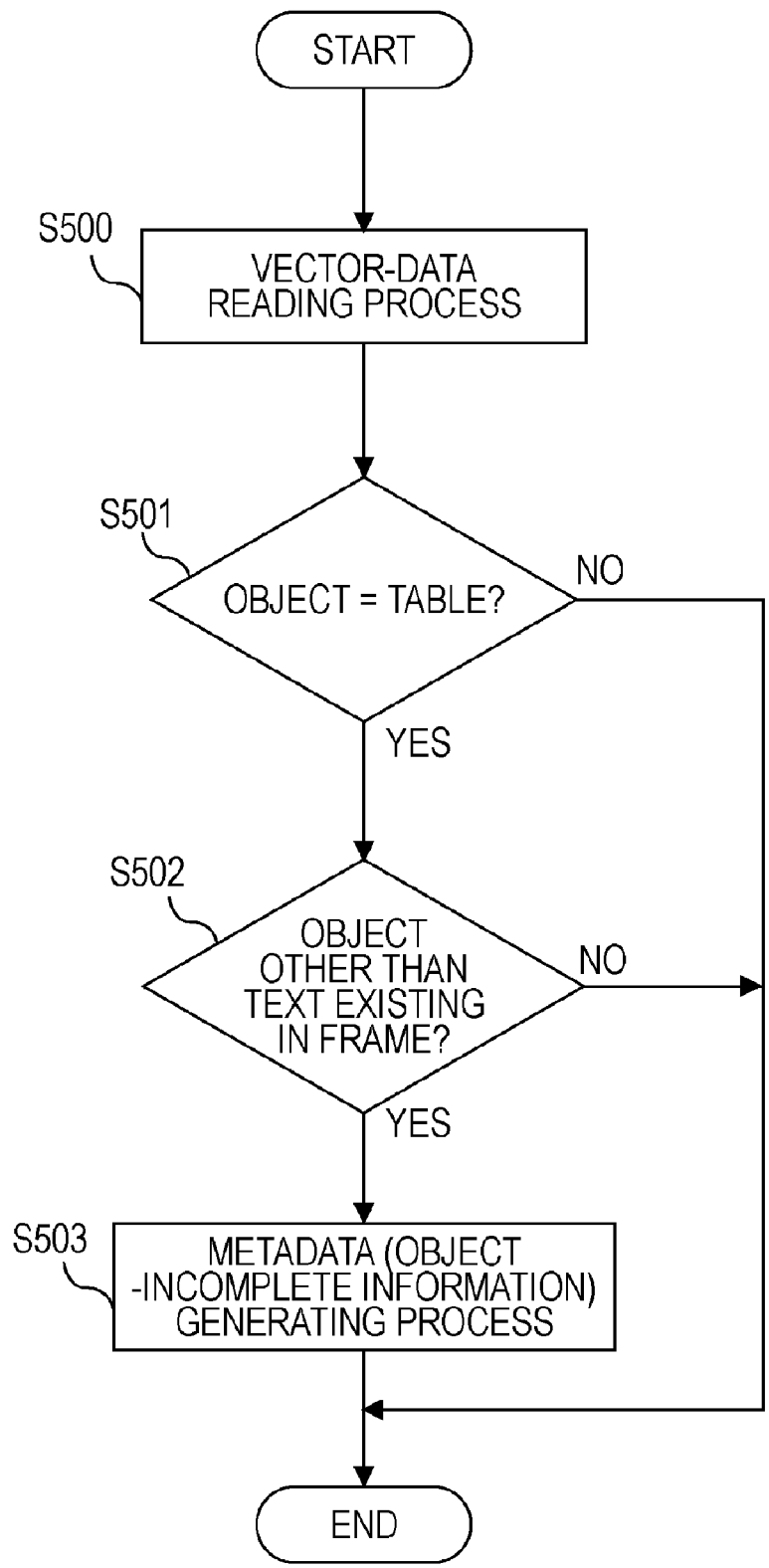
FIG. 5 is a flowchart showing an image analyzing process according to a first embodiment of the present invention.

As shown in FIG. 5, first, in step S500, each item of object data is read from the vector data file saved in the storage unit 111 or the external apparatus 103 or 104.

Then, the CPU of the data processing unit 115 checks whether the attribute of the object data that has been read is TABLE. If the attribute is TABLE (YES in step S501), the process proceeds to step S502, and otherwise the image analyzing process is exited.

If the attribute of the object data is TABLE, in step S502, the CPU of the data processing unit 115 checks whether information other than text (font) is included in the cell information inside the frame of the table. If a text string is not complete, the incomplete text string is not properly recognized as text by the OCR process described earlier. Thus, if an incomplete text string exists in the table, it is determined that information other than text exists in the table. If information other than text is included in the table so that the image is incomplete (YES in step S502), the process proceeds to step S503, and otherwise the image analyzing process is exited.

Regarding an object for which it is determined that information other than text is included so that the image is incomplete, image-incomplete information is generated.

The incomplete image occurs when information that exists as cell information in the form of text or values in a spreadsheet application on an external apparatus is not properly printed due to difference in resolution, error in layout, or the like when printed on a recording medium.

FIG. 6A shows an example of the problem. An image 600 represents an original document for which a meta image data file is created, as viewed on a display screen before printing, and it represents stored original data itself. At the same time, it represents a printed image in which the incomplete image has been corrected.

FIG. 6B shows an actually printed image 601 of an original document for which a meta image data is to be created.

In the printout of the original document, text information is not accommodated at the top end of the cell, so that it is difficult to recognize the text string properly in the image.

The image-incomplete information is appended to the metadata of the meta image data file that has been read, and is stored in the storage unit 111 or the external apparatus 103 or 104. The image analyzing process is then exited.

An example of the format of meta image data file will be described with reference to FIG. 7.

Figure 7:
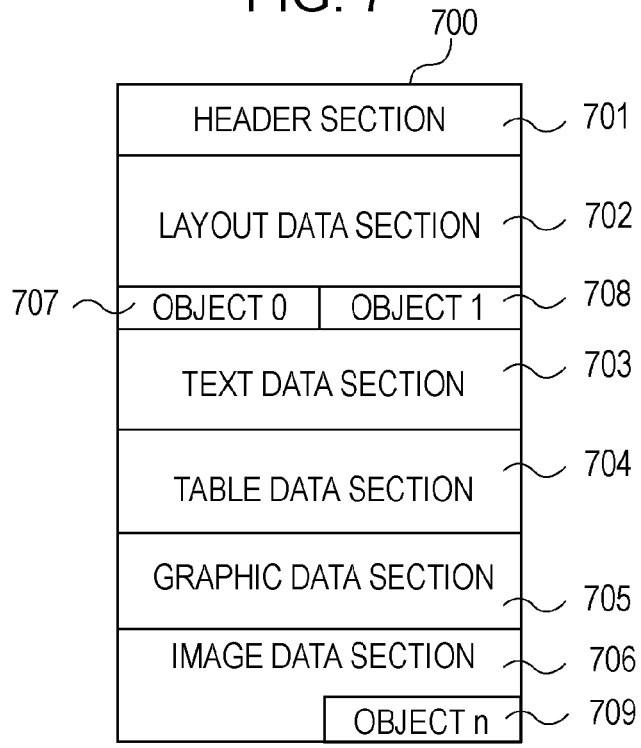
FIG. 7 is a diagram showing an example of the format of a meta image file according to the first embodiment of the present invention.

FIG. 7 is a diagram showing an example of the structure of a meta image data file in this embodiment. Meta image data 700 is formed of a header section 701, metadata section 707 to 709, a layout data section 702, and image data sections 703 to 706.

The header section 701 contains information identifying a component of the meta image data 700. The layout data section 702 contains attribute information of each block recognized for each attribute, such as TEXT, IMAGE (natural image), or TABLE in the original document image, and rectangle address information of each of the attributes on the original document.

The TEXT data section 703 to the IMAGE data section 706 contain image data converted into vectors, and all objects for individual attributes are contained sequentially as object 0 in the metadata section 707, object 1 in the metadata section 708, . . . and object n in the metadata section 709.

Figure 8:
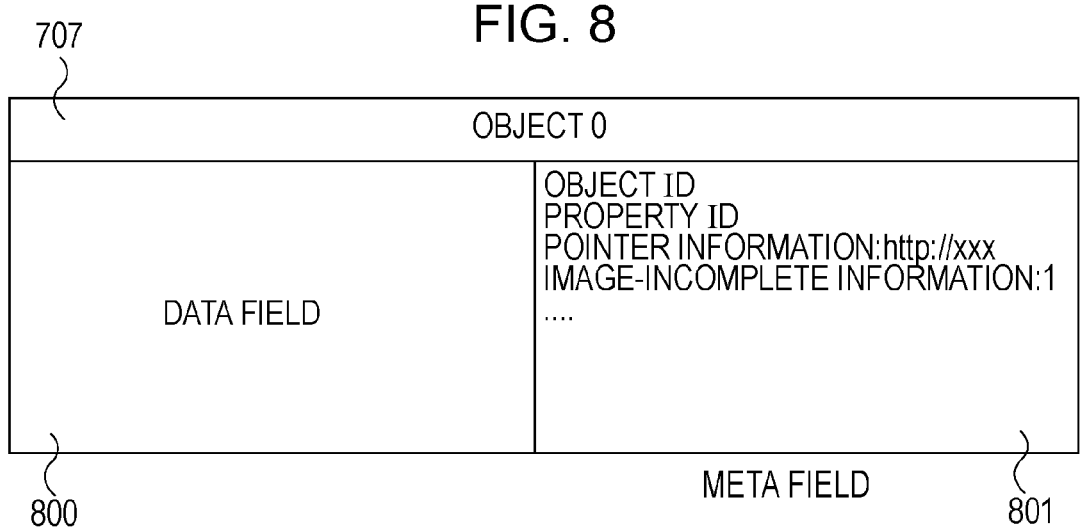
FIG. 8 is a diagram showing the structure of image data according to the first embodiment of the present invention.

Each of the object data 707, 708, and 709 is further divided into a data field 800 and a meta field 801, as shown in FIG. 8. The data field 800 stores information representing the body of the relevant object. The meta filed 801 stores information regarding the object data, such as an object ID, an attribute ID representing the attribute of the object, pointer information indicating the storage location of the original data, and image-incomplete information indicating whether a problem exits in the image of the object. In the example shown in FIG. 8, pointer information is stored for each object.

In the data field for each attribute, the following information is stored.

The TEXT data section 703 contains a result of text recognition obtained through text recognition of the TEXT object.

The TABLE data section 704 contains details of the structure of the TABLE object.

The details refer to the frame information, value information, cell information, and so forth, described earlier. The GRAPHIC data section 705 stores outline data information of the GRAPHIC block. The IMAGE data section 706 contains image data cut out from image data.

Postprocessing

Then, the meta image data file obtained through the vector generating process in step S301 undergoes postprocessing in step S303.

As the postprocessing, for example, in the case of copying, image processing such as color processing and spatial frequency correction optimal for each object in the meta image data file is executed before printing by the printing unit 112. In the case of saving of a file, the meta image data file is stored in the storage unit 111. In the case of sending a file, the meta image data file read from the storage unit 111 is sent to the external apparatus 103 or 104 via the network I/F 114.

In the case of copying of the original, the CPU of the data processing unit 115 refers to the pointer information of original data, stored in the meta image data file, and obtains the original data from an external apparatus or image processing apparatus existing on a network. Then, the image data that has been obtained undergoes image processing on the basis of the result of analysis, similarly to the case of printing described above, and is printed by the printing unit 112.

Of the postprocessing executed in step S303, regarding the original copying operation, a series of procedures from an original-data obtaining procedure to an original-copy outputting procedure will be described in further detail with reference to a flowchart shown in FIG. 9.

Figure 9:
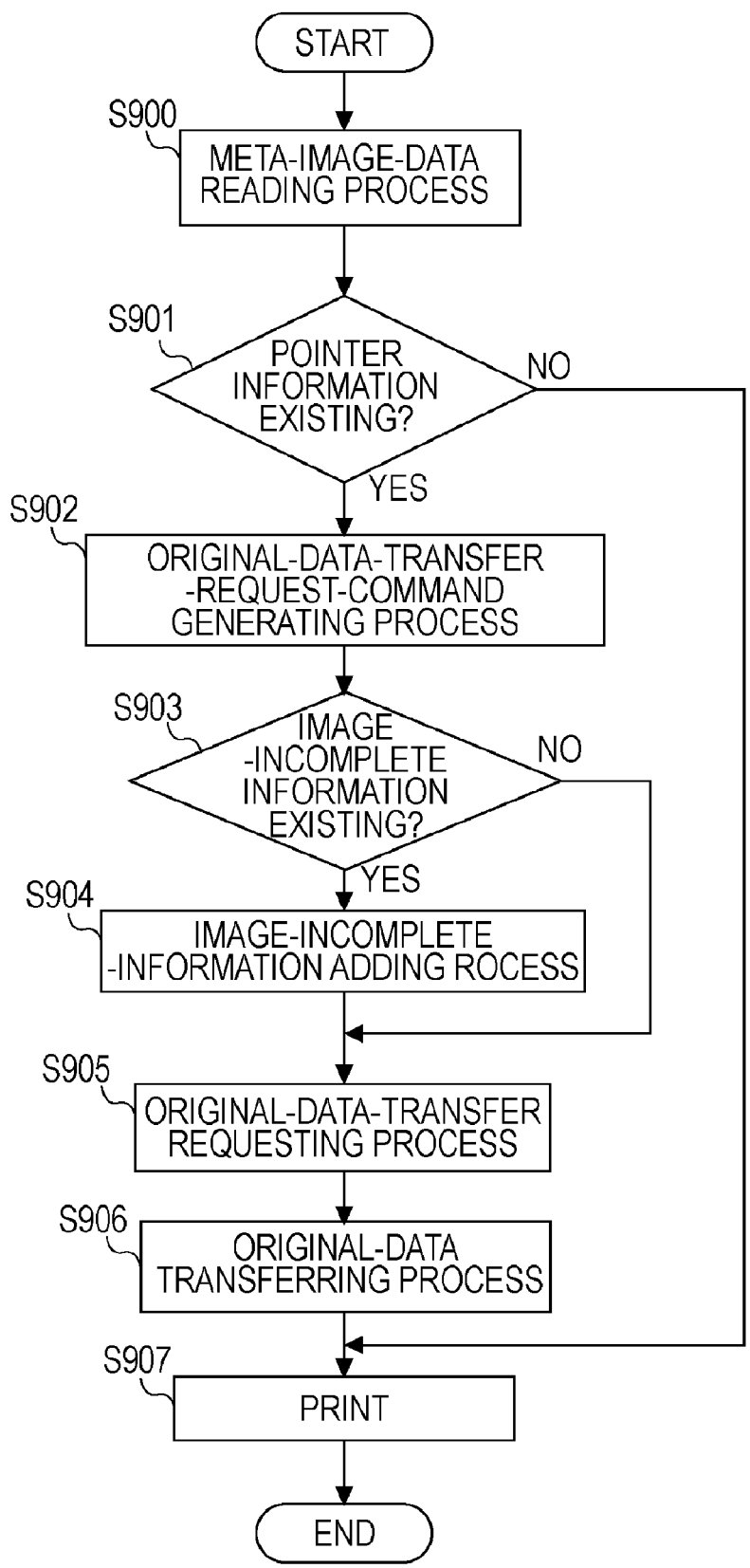
FIG. 9 is a flowchart showing an original copying process according to the first embodiment of the present invention.

Referring to FIG. 9, in the original copying operation, first, in step S900, the CPU of the data processing unit 115 checks whether pointer information is present or absent in the meta field. If pointer information is present (YES in step S901), the operation proceeds to step S902. If pointer information is absent (NO in step S901), the operation proceeds to step S907, and printing is performed on the basis of data of the stored meta image data file, similarly to the case of ordinary copying. In this case, an incomplete image is printed without any correction.

In step S902, the CPU of the data processing unit 115 executes a process for generating a command for requesting transfer of original data. The transfer request command is a set of data including information such as a destination of the transfer request, a transfer mode indicating a mode of transfer, and a source of the transfer request, i.e., information (e.g., an IP address) of the own image processing apparatus 100. Upon completion of the process for generating the command, the operation proceeds to step S903.

In this case, the destination of the transfer request refers to information (e.g., an IP address) of the external apparatus indicated by the pointer information in the original data.

In step S903, the CPU of the data processing unit 115 checks whether the meta image data that has been read includes image-incomplete information. If image-incomplete information is included (YES in step S903), the operation proceeds to step S904. If image-incomplete information is not included (NO in step S903), the operation proceeds to step S905.

In step S904, the image-incomplete information is added to the original-data transfer request command described above. In the example shown in FIG. 8, "1" is stored as image-incomplete information in the meta field of the object 0. In this case, it is determined that the image is incomplete, so that image-incomplete information is added. If "0" is stored in place of image-incomplete information, image-incomplete information is not added.

In step S905, the CPU of the data processing unit 115 sends the original-data transfer request command to an external apparatus or image processing apparatus indicated by the pointer information via the network I/F 114. The operation then proceeds to step S906.

In step S905, in response to the original-data transfer request command, an external apparatus (e.g., 103 or 104) on the network transfers the original data to the image processing apparatus 100. At this time, if the transfer request command includes image-incomplete information, the external apparatus corrects the original data saved therein before outputting the original data.

Alternatively, if the image processing apparatus 100 has an editing function, the external apparatus may transfer the original data to the image processing apparatus 100 without correcting it, and the original data may be corrected at the image processing apparatus 100.

If the storage location of the original data is the storage unit 111 of the image processing apparatus 100, the original data is transferred from the storage unit 111 of the image processing apparatus 100 to an external apparatus, and the external apparatus corrects the original data and transfers the corrected data to the image processing apparatus 100.

Alternatively, if the image processing apparatus 100 has an editing function, the original data may be corrected at the image processing apparatus 100 without transferring it to an external apparatus.

For the purpose of correction, for example, font data of cell information inside the frame of a table of a stored TABLE object is changed to be smaller.

That is, it is possible to accommodate complete text inside the frame by reducing the font size.

Alternatively, the frame information of the TABLE object may be corrected so that the frame will be somewhat larger. The data 600 shown in FIG. 6A is an example where the frame information has been changed so that the frame becomes larger.

In step S907, the original data than has been transferred undergoes image processing such as color processing and spatial frequency correction optimal for each object, and the result is printed by the printing unit 112.

Through the original copying process described above, it is possible to correct original data itself, which has been difficult with existing art, so that a favorable image can be output for the user.

Second Embodiment

In the first embodiment, it is determined that an image is incomplete if an object other than ext is included in cell information of a TABLE object in the image analyzing process. Alternatively, it is possible to determine whether an image is incomplete on the basis of the layout status of an object in a cell.

FIGS. 10A and 10B shows an example of a method of determining whether an image is incomplete. FIG. 10A shows a TABLE object 1000 represented by a complete image, and FIG. 10B shows a TABLE object 1001 represented by an incomplete image.

Regarding cell information inside the frames of the TABLE objects 1000 and 1001, 1002 and 1004 denote frame information (outline data), and 1003 and 1005 denote cell information inside the frames. In the TABLE object 1000, the cell information 1003 inside the frame adjacent to the frame information represents text. On the other hand, in the TABLE object 1001, the cell information 1005 inside the frame adjacent to the frame information is not recognized as text and is recognized as outline data instead. In this case, it is determined that the image is incomplete in the TABLE object 1001.

That is, it is analyzed whether an image is incomplete on the basis of whether, in a TABLE object, information not recognized as text, i.e., outline data, is included in a region adjacent to the frame information of the cell information inside the frame.

Figure 11:
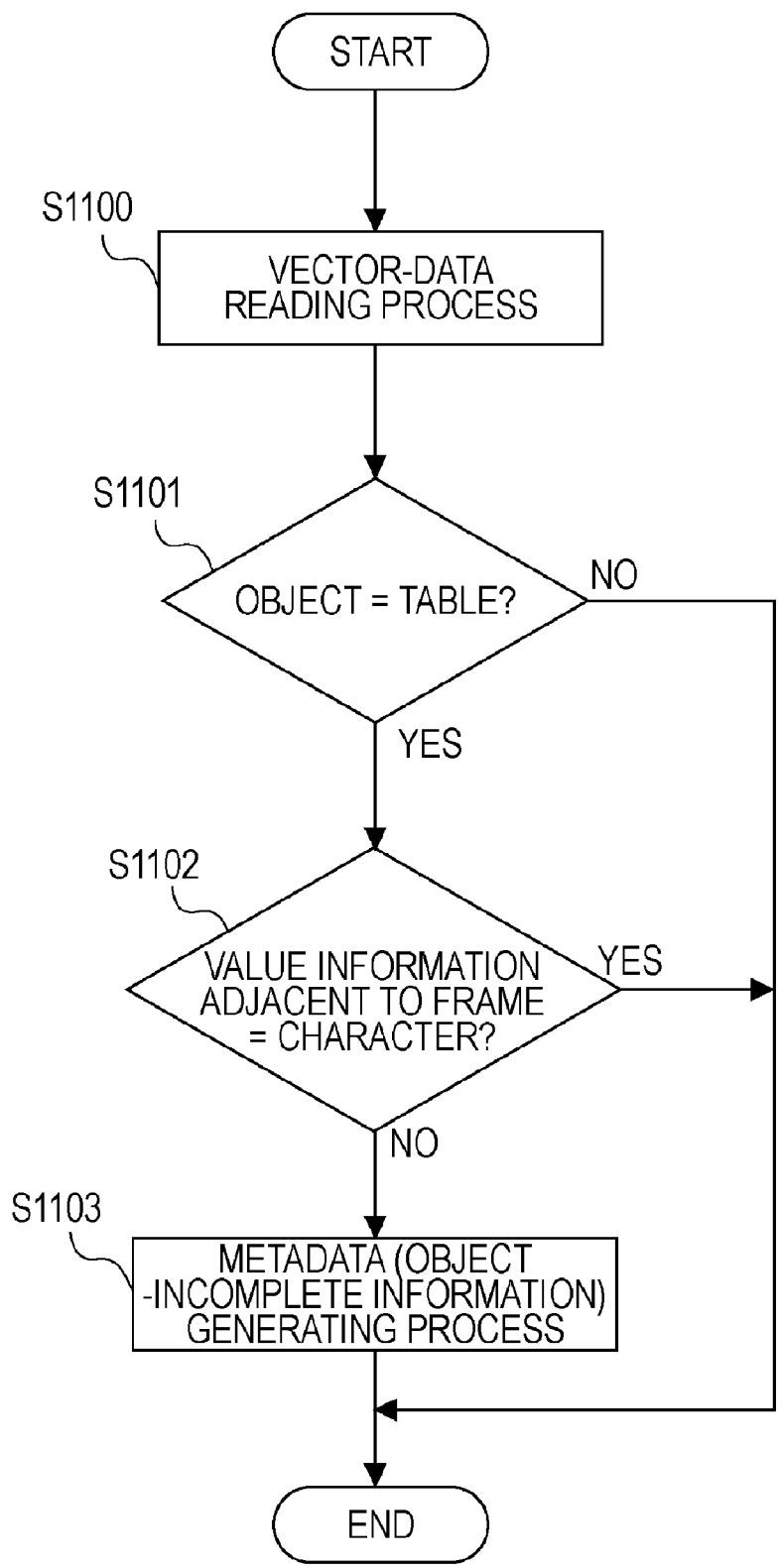
FIG. 11 is a flowchart showing an image analyzing process according to the second embodiment of the present invention.

FIG. 11 shows the flow of an image analyzing process in this embodiment. Since the second embodiment is otherwise the same as the first embodiment, detailed description will be omitted.

As shown in FIG. 11, first, in step S1100, each item of object data is read from the meta image data file saved in the storage unit 111 or the external apparatus 103 or 104.

Then, in step S1101, it is checked whether the attribute of the object is TABLE. If the attribute is TABLE, the process proceeds to step S1102, and otherwise the image analyzing process is exited.

Then, if the attribute is TABLE, in step S1102, the CPU of the data processing unit 115 determines whether information most adjacent to the frame among the cell information inside the frame is text (font). If it is determined that the information is not text, it is determined that the image is incomplete, so that the process proceeds to step S1103. Otherwise, the image analyzing process is exited.

If it is determined that the information most adjacent to the frame is outline data or approximated function data, which is non-text information, image-incomplete information is generated for the corresponding object.

That is, since the frame information is outline data, image-incomplete information is generated when outline data is continuous.

The image-incomplete information that has been generated is appended to the metadata of the meta image data file that has been read, and is then stored in the storage unit 111 or the external apparatus 103 or 104. The image analyzing process is then exited.

As described above, information of layout in the frame of the TABLE object is taken into consideration in determining whether an image is incomplete. Thus, it is possible to determine whether an image is incomplete more accurately than in the first embodiment.

Third Embodiment

In the first and second embodiments, it is determined whether an image is incomplete in a TABLE object on the basis of whether non-text information is included in cell information inside the frame. Alternatively, it is possible to determine whether an image is incomplete by counting the number of characters in each object or checking the ratio between the number of white dots and the number of black dots at the pixels of each object. An image analyzing process according to a third embodiment will be described with reference to FIG. 12. Since the third embodiment is otherwise the same as the first embodiment, detailed description will be omitted.

Image Analyzing Process

Figure 12:
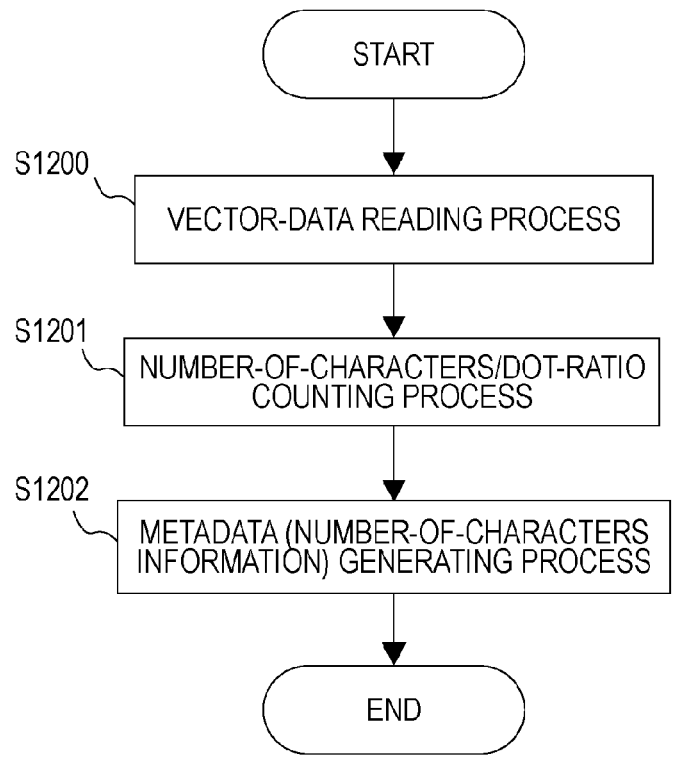
FIG. 12 is a flowchart showing an image analyzing process according to a third embodiment of the present invention.

As shown in FIG. 12, first, in step S1200, each item of object data is read from the vector data file saved in the storage unit 111 or the external apparatus 103 or 104.

Then, in step S1201, among the items of object data that have been read, for object data including text information, the number of characters constituting the text information is counted. For example, a TEXT object or cell information of a TABLE object includes text information.

Alternatively, among the items of object data that have been read, for object data including text information, the ratio between the number of white dots and the number of black dots at the pixels constituting the text information is checked.

Regarding the object for which the number of characters has been counted or the ratio between the number of white dots and the number of black dots has been checked, in step S1202, number-of-characters information is generated.

Figure 13:
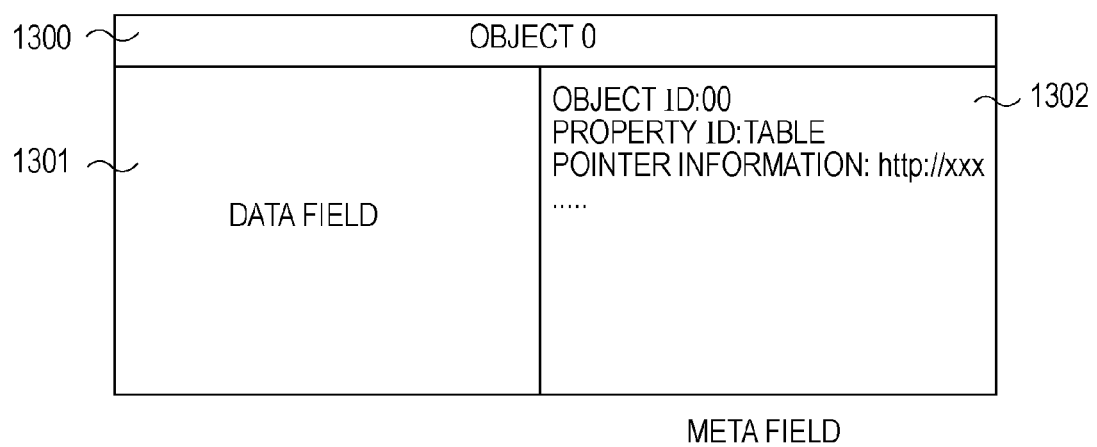
FIG. 13 is a diagram showing the structure of image data according to the third embodiment of the present invention.

FIG. 13 shows an example of object data. Object data 1300 includes a data field 1301 and a meta field 1302. The number-of-characters information is included as an element of the meta field.

The number-of-characters information that has been generated is appended to the metadata of the meta image data file that has been read, and is then stored in the storage unit 111 or the external apparatus 103 or 104. The image analyzing process is then exited.

Postprocessing

The flow of postprocessing (copying of an original) in the third embodiment will be described with reference to FIG. 14.

Figure 14:
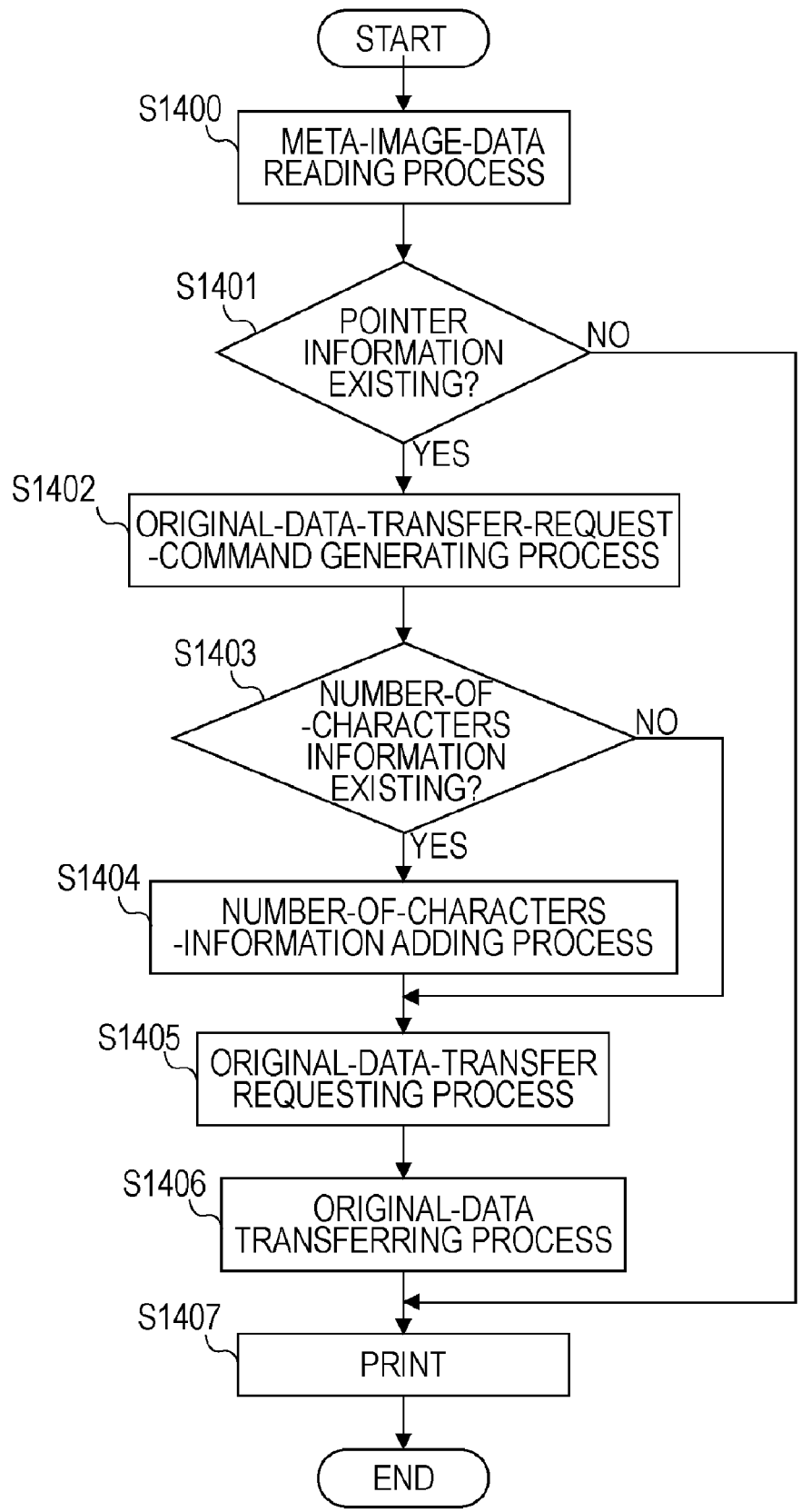
FIG. 14 is a flowchart showing an original copying process according to the third embodiment of the present invention.

In the original copying operation, as shown in FIG. 14, in step S1400, the data processing unit 115 reads meta image data stored in the storage unit 111 or the external apparatus 103 or 104.

Then, in step S1401, it is checked whether pointer information indicating the storage location, stored in the meta field, is present. If pointer information is present, the process proceeds to step S1402. Otherwise, the process proceeds to step S1407, and the stored meta image data is printed similarly to ordinary copying.

In step S1402, the CPU of the data processing unit 115 executes a process of generating an original-data transfer request command. The transfer request command is a set of data including information such as a destination of the transfer request, in this case, information (e.g., an IP address) indicating an external apparatus indicated by the pointer information of the original data, a transfer mode indicating a mode of transfer, and a source of the transfer request, i.e., information (e.g., an IP address) of the own image processing apparatus 100. Upon completion of the process for generating the command, the process proceeds to step S1403.

In step S1403, the CPU of the data processing unit 115 checks whether the meta image data that has been read includes number-of-characters information. If number-of-characters information is included, the process proceeds to step S1004. If number-of-characters information is not included, the process proceeds to step S1405.

In step S1404, the number-of-characters information is added to the original-data transfer request command described above.

In step S1405, the CPU of the data processing unit 115 issues the original-data transfer request command to an external apparatus via the network I/F 114. The process then proceeds to step S1406.

In step S1406, the external apparatus (e.g., 103 or 104) on the network, having received the original-data transfer request command, transfers the original data to the image processing apparatus 100.

At this time, if the transfer request command includes number-of-characters information, regarding the relevant object of the original data stored on the external apparatus (e.g., 103 or 104) on the network, the number of characters is counted or the ratio between the number of white dots and the number of black dots is checked. If the number of characters or the ratio does not match the number-of-characters information, the original data is corrected before it is output.

Alternatively, if the image processing apparatus 100 has an editing function, the external apparatus may transfer the original data to the image processing apparatus 100 without correcting it, and the original data may be corrected at the image processing apparatus 100.

If the storage location of the original data is the storage unit 111 of the image processing apparatus 100, regarding the relevant object in the original data, the number of characters is counted or the ratio between the number of white dots and the number of black dots is checked at the image processing apparatus 100.

If the number of characters or the ratio does not match the number-of-characters information, the original data is once transferred to the external apparatus, where the original data is corrected, and the corrected data is returned to the image processing apparatus 100.

Alternatively, if the image processing apparatus 100 has an editing function, the original data may be corrected at the image processing apparatus 100 without transferring it to an external apparatus.

For the purpose of correction, for example, it is possible to reduce the font size of the original data before transferring it.

Alternatively, the frame information of the TABLE object may be changed so that the frame will be somewhat larger.

In step S1407, the original data than has been transferred from the external apparatus on the network undergoes image processing such as color processing and spatial frequency correction optimal for each object, and the result is printed by the printing unit 112.

As described above, according to this embodiment, for each object, it is checked whether number-of-characters information is included. Accordingly, through the original copying process described above, compared with the first and second embodiments, it is possible to provide an even more favorable image for the user.

Fourth Embodiment

In the first to third embodiments, original data is corrected if metadata related to the original data exists. Alternatively, it is possible to add information for determining whether to permit data correction in metadata so that an original copying operation can be controlled on the basis of the information.

In this case, the user can select as desired whether original data stored in an external apparatus, image processing apparatus, or the like on the network or an original document that has been read is to be output as it is or to be corrected before it is output.

More specifically, in the method of determining whether an image is incomplete, shown in FIGS. 10A and 10B, correction is performed when outline data is continuous. However, if outline data is continuous in a true image, the image becomes distorted if correction is simply performed. In order to avoid this problem, it is allowed to control whether to correct original data before it is output.

Alternatively, an access authority may be defined for each object in original data so that it is possible to control whether to permit data correction according to the access authority.

Fifth Embodiment

The present invention is not limited to the embodiments described above, and the features of the embodiments may be combined.

Other Embodiments

It is possible to store an a storage medium a program for achieving the functions of any one of the embodiments described above, so that a computer can read and execute code of the program stored on the storage medium. This method of processing falls within the scope of the present invention. Furthermore, the storage medium storing the program, and the program itself, fall within the scope of the present invention.

The storage medium may be, for example, a floppy disk, a hard disk, an optical disk, a magneto-optical disk, a CD-ROM, a magnetic tape, a non-volatile memory card, or a ROM.

Furthermore, without limitation to executing processing with the program stored on the storage medium alone, the operation according to any one of the embodiments described above may be executed on an operation system (OS) in cooperation with functions of other software or an extension board. This also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-157608 filed Jun. 14, 2007, which is hereby incorporated by reference herein in its entirety.

What is claimed is:

1. An image processing apparatus comprising:
an object generating unit configured to divide input image data input from the image;
an analyzing unit configured to analyze whether the input image data divided into objects by the object generating unit is incomplete; and
an obtaining unit configured to detect information indicating a storage location of original data of the input image data divided into the objects from the input image data, and to obtain the original data from the storage location indicated in the detected information,
wherein the original data obtained from the storage location by the obtaining unit is corrected on the basis of a result of analysis by the analyzing unit to generate a complete image, and the complete image is output.

2. The image processing apparatus according to claim 1, further comprising a metadata generating unit configured to generate metadata indicating the result of analysis by the analyzing unit.

3. The image processing apparatus according to claim 1, wherein the input image data divided into objects by the object generating unit can be classified at least into a TEXT object representing text, a GRAPHIC object representing a line or graphic pattern, a TABLE object representing a table, an IMAGE object representing a natural image, and a BACKGROUND object representing a background.

4. The image processing apparatus according to claim 3, wherein the analyzing unit determines whether an image of the TABLE object is incomplete on the basis of whether non-text information is included in cell information within a frame of the TABLE object.

5. The image processing apparatus according to claim 3, wherein the analyzing unit determines whether an image of the TABLE object is incomplete on the basis of whether non-text information is included in a region adjacent to cell information within a frame of the TABLE object.

6. The image processing apparatus according to claim 3, further comprising a correcting unit configured to correct the original data, wherein the correcting unit changes the size of the frame of the TABLE object.

7. The image processing apparatus according to claim 3, further comprising a correcting unit configured to correct the original data, wherein the correcting unit changes a font size of the TEXT object.

8. The image processing apparatus according to claim 1, wherein the analyzing unit counts a number of characters in each of the objects.

9. The image processing apparatus according to claim 1, wherein the result of analysis includes information for determining whether to permit correction of each object in the original data, and an image obtained by performing correction on the basis of the result of analysis is output.

10. The image processing apparatus according to claim 1, wherein the result of analysis includes information indicating an access authority for each object in the original data, and an image obtained by performing correction on the basis of the result of analysis is output.

11. An image processing apparatus comprising:
an analyzing unit configured to analyze an incomplete portion of input image data; and
an obtaining unit configured to detect information indicating a storage location of original data of the input image data from the input image data, and to obtain the original data from the storage location indicated in the detected information,
wherein the original data obtained from the storage location by the obtaining unit is corrected on the basis of a result of analysis by the analyzing unit to generate a complete image, and the complete image is output.

12. An image processing method comprising:
dividing input image data into objects;
analyzing whether the input image data divided into objects is incomplete; and
detecting information indicating a storage location of original data of the input image data divided into the objects from the input image data, and obtaining the original data from the storage location indicated in the detected information,
wherein the original data obtained from the storage location is corrected on the basis of a result of analysis in the analyzing to generate a complete image, and the complete image is output.

13. An image processing method comprising:
analyzing an incomplete portion of input image data; and
detecting information indicating a storage location of original data of the input image data from the input image data, and obtaining the original data from the storage location indicated in the detected information,
wherein the original data obtained from the storage location in the obtaining is corrected on the basis of a result of analysis in the analyzing to generate a complete image, and the complete image is output.

14. A computer-readable storage medium storing a program configured to execute the image processing method according to claim 12.

15. A computer-readable storage medium storing a program configured to execute the image processing method according to claim 13.

16. The image processing apparatus according to claim 1, wherein the input image data is generated by reading an original document image obtained by outputting the original data.

17. The image processing apparatus according to claim 11, wherein the input image data is generated by reading an original document image obtained by outputting the original data.

18. The image processing method according to claim 12, wherein the input image data is generated by reading an original document image obtained by outputting the original data.

19. The image processing method according to claim 13, wherein the input image data is generated by reading an original document mage obtained by outputting the original data.

* * * * *